2,891,885

METHOD OF MAKING COMPOSITE GLASS-POLYESTER STRUCTURES

Marvin C. Brooks, Packanack Lake, N.J., assignor to United States Rubber Company, New York, N.Y., a corporation of New Jersey No Drawing. Application November 16, 1953
Serial No. 392,480

10 Claims. (Cl. 154—128)

This invention relates to a method of improving the bond between glass and cured polyester resins. In my copending application Serial No. 343,505, filed March 19, 1953, I have described a method of obtaining an improved bond between glass and a cured polyester resin by incorporating in the resin prior to association thereof with the glass certain silane materials, namely, vinylalkoxysilanes and vinyl-2-chloroalkoxysilanes wherein each alkoxy group contains from two to six carbon atoms, vinylallyloxysilanes, vinylacyloxysilanes wherein the acyloxy group contains from two to six carbon atoms, and liquid reaction products of vinylchlorosilanes with saturated aliphatic dihydric alcohols.

In my copending application Serial No. 390,717, filed November 6, 1953, I describe an alternative method of improving the bond between glass and cured polyester resins which comprises pre-treating the glass, prior to association with the uncured polyester resin, with a solution of the liquid vinylchlorosilane-saturated aliphatic dihydric alcohol reaction products, vinyl-2-chloroalkoxysilanes or vinylacyloxysilanes in a volatile solvent followed by heating to evaporate the solvent. Attempts to use the vinylalkoxysilanes and vinylallyloxysilanes in such a "pre-treatment" method have not been successful because of poor bonding of the treated glass to the polyester resin, this poor bonding being manifested by serious loss of flexural strength in a glass fabric laminate after 3 hours immersion in boiling water.

The present invention is based upon my discovery that the vinylalkoxysilanes and vinylallyloxysilanes can be successfully used for the pre-treatment of glass, prior to association with a curable polyester resin and curing of such a resin, provided that a catalytic quantity of a weak acid or base is added to the treating solution. I find that the acid or base catalyst is essential if worthwhile effects from treatment of the glass with solutions of vinylalkoxysilanes or vinylallyloxysilanes are to be obtained; the use of such an acid or base catalyst in combination with solutions of vinyl-2-chloroalkoxysilanes, vinylacyloxysilanes, and reaction products of vinylhalosilanes and diols, does not enhance the effectiveness of treatment with such solutions.

The treating solution of the present invention is prepared by dissolving a vinylalkoxysilane or a vinylallyloxysilane and a weak acid or base catalyst in a solvent composed of water and a water-miscible organic solvent. Effective treating solutions contain from 0.02% to 5%, preferably from 0.1% to 1.5%, of the vinylalkoxysilane or vinylallyloxysilane, and from 0.1% to 5% of the weak acid or base catalyst, these percentages being by weight based on the weight of the solution. The preferred solvent media are mixtures consisting of from 10 to 80% of water and correspondingly from 90 to 20% of a solvent selected from the group consisting of ethanol, isopropanol, n-propanol and acetone.

The treating solution of my invention is applied as a coating on glass surfaces and particularly on glass fiber surfaces such as those of glass fabrics which are to be assembled into laminates bonded with the polyester resins. The mode of treatment with the solution may vary depending upon the nature of the surface. For example, in the case of a solid glass surface, the treating solution may be applied by brushing, spraying or immersion. In the case of glass fiber surfaces the treatment is most conveniently effected by immersion. Following application of the coating of the solution to the glass surface, heat is applied to drive off the solvent medium and, almost invariably, the acid or base employed as catalyst. The dried coated surface exhibits the very important property of becoming tightly bonded to polymerizable polyester resins cured in contact therewith. The most important result of this type of bonding is that it enables the preparation of resin-bonded, glass fiber laminates having improved flexural strength, particularly after high humidity aging or prolonged exposure to liquid water. Another advantage resulting from the better bonding of glass to polyester resin is an increase in the transparency of resin-bonded glass fiber laminates.

The treating solution of the present invention is effective only when applied to glass surfaces which are substantially free of all organic residues. Since lubricating compounds are commonly used in the preparation of glass fibers, it is particularly important that such fibers be cleaned before treatment according to the process of the present invention. As is well known to those familiar with glass fiber technology, glass fibers can be cleaned conveniently by simply heating them to high temperatures, e.g., of the order of 750° F.

The vinylalkoxysilanes and vinylallyloxysilanes which can be used in the treating solutions of the present invention are defined by the following formula:

$$(CH_2=CH)_n-Si(OR)_{4-n}$$

wherein $n$ is 1 or 2 and R is an alkyl group having from 2 to 4 carbon atoms, e.g. ethyl, n-propyl, isopropyl, n-butyl, isobutyl, sec-butyl, etc., or is allyl. Although the process of my invention works satisfactorily when R is methyl, the use of vinylmethoxysilanes is not recommended because of their toxicity. The use of silanes wherein R is an alkyl group having more than 4 carbon atoms is not convenient because of the poor solubility of these alkoxysilanes in these solvents of the type described above.

Weak acids or bases which are added to the treating solution of this invention may be defined as those weak acids or bases having ionization constants at 25° C. between $5 \times 10^{-3}$ and $5 \times 10^{-6}$.

In order to obtain the maximum advantages of my invention it is also important that the acid or base catalyst be volatile so that it will be removed during volatilization of the solvent medium. It may be that the complete removal of the acid or base catalyst is expedited by reason of formation of a minimum-boiling azeotrope with one or both components of the solvent medium. The drying step to remove the solvent medium and the catalyst is carried out at temperatures in the range of from 100° C. to 400° C. Illustrative acids which meet the requirements for ionization constant and volatility are acetic acid, chloroacetic acid and propionic acid. Illustrative bases which meet these requirements are ammonium hydroxide, dimethylamine, monoethanolamine, and triethanolamine. Of these, I prefer to use acetic acid or ammonium hydroxide.

I have found that the use of acids or bases which are substantially stronger than those specified above adversely affects the strength of the glass fibers; thus, glass fabric laminates made with glass fibers treated with the solutions which contain strong acids or bases have been found to be brittle and have relatively low strength. When strong acids or bases are used in very small quantities the detrimental effects thereof are reduced greatly but an improvement in strength comparable to that obtained with a weak acid or weak base is not realizable. The use of acids or bases which are weaker than those specified above is undesirable because they exert little or no catalytic effect on the action of the silane upon the glass.

The use of acids or bases which are not completely vaporized during the drying step of the treating process is not desirable because the unvaporized residue hydrolyzes the polyester resin and thereby materially weakens the construction; the use of an acid or base which is completely removed by vaporization obviates this difficulty.

The curable polyester resin composition used in the practice of my invention is a well-known material and comprises an organic peroxide as polymerization catalyst, and an esterification product of an alpha-ethylenic alpha, beta-dicarboxylic acid with a glycol, this esterification product being an advanced linear polyester containing unesterified carboxyl groups and having an acid number of from 5 to 100 and being dissolved in and copolymerizable with a liquid monomeric polymerizable ethylenic compound which is immiscible with water. Polyesters of this type are described in U.S. Patent 2,195,362. Examples of the liquid monomeric polymerizable ethylenic compound with which the polyesters of this type are mixed are, for instance, styrene, diallyl phthalate or triallyl cyanurate. Typical resinous mixes of unsaturated linear polyester and copolymerizable monomer used in practicing my invention are described in U.S. Patent 2,255,313 and in British Patents 540,168 and 540,169. As descriptive of such mixes, the disclosure of said patents is hereby incorporated by reference. As is well known, the unsaturated dicarboxylic acid may be partially replaced by another dibasic acid which may be typified by adipic acid, succinic acid, sebacic acid, phthalic acid, and tetrachlorophthalic anhydride, and which may be used in amounts up to 3 moles per mole of unsaturated dicarboxylic acid.

Any organic peroxide that functions as a free radical type polymerization initiator can be used to effect curing of the polyester resin. Examples of such peroxides are hydroperoxides, e.g., tertiarybutylhydroperoxide, cumene hydroperoxide, paramenthanehydroperoxide, etc., peroxy esters, e.g., di-t-butyl diperoxyphthalate, t-butyl peroxyacetate, etc.; alkyl peroxides, e.g., di-t-butyl peroxide, dibenzyl peroxide, etc.; ketone peroxides, e.g., methylethyl ketone peroxide, cyclohexanone peroxide, etc.; and acyl peroxides, e.g., benzoyl peroxide, para-chlorobenzoyl peroxide, 2,4-dichlorobenzoyl peroxide, lauroyl peroxide, etc.

The amount of the silane treating agent applied to the glass surface in accordance with my invention is extremely small, typically ranging from 1 to 10 molecular layers on the glass surface.

Probably the most important application of my invention is in bonding fibrous glass to cured polyester resins. Use of the invention effects a considerable increase in flexural strength of the products, and particularly greater retention of flexural strength after the products have been exposed to water.

Although I anticipate that the major application of my invention will be in the treatment of glass fibers or fabrics to be used for the reinforcement of polyester resins, I do not exclude other applications wherein it will be profitable to treat a glass surface in order to obtain better adhesion of cured polyester resins thereto. For example, a solid glass article can have its surface treated in accordance with my invention and then be associated with a curable polyester resin.

In demonstrating the effectiveness of this invention, I have chosen to report the flexural strength of resin-bonded glass fabric laminates. It is well known to those skilled in the art that changes in tensile strength and compressive strength generally parallel changes in flexural strength. The flexural strength data reported herein have been obtained as specified in Federal Specification L-P-406a-Method 1031. The most significant improvement in the physical properties of resin-bonded, glass fiber laminates brought about by the method of this invention is the great improvement in their strength retention after having been aged under high humidity conditions. As is common practice among those experienced in the field we have measured this strength retention of the laminates after the laminates have stood in boiling water for 3 hours. This treatment is generally recognized to be equivalent to at least one month's standing in water at room temperature. Typical illustrations demonstrating the use of my invention as a means of improving the flexural strength of glass fiber laminates, are given in the following examples. All parts and percentages given herein are by weight.

EXAMPLE I

This example illustrates the use of three different silanes in the process of the present invention. The priming solutions were composed of 1 part of silane, 2 parts of ammonium hydroxide (15 N, I.C. $1.8 \times 10^{-5}$), 48.5 parts of isopropanol and 48.5 parts of water. For comparison, laminates were also prepared from glass fabric coated with comparable solutions containing no ammonium hydroxide.

The procedure followed in preparing the laminates was to first impregnate the glass fabric with the priming solution; the fabric was then dried by placing it on a hot metal plate for about one minute. The fabric used in all of the laminates was a long-shaft satin weave construction with a 225⅓ warp, 225⅓ fill, and 57 warp ends with 54 picks. It was heat-cleaned prior to being washed with the priming solution.

The several treated fabrics were used in conjunction with a curable liquid polyester resin. The resin was made as follows: Ninety-eigh parts of maleic anhydride, 148 parts of phthalic anhydride, and 163 parts of propylene glycol were heated for 3 hours at 200° C., the final half-hour being at reduced pressure. The resultant alkyd resin had an acid number of 55. Sixty-seven parts of this alkyd were combined with 33 parts of styrene to form the casting resin.

Each laminate was made by press-curing the resin in contact with the fabric. The resin contained 1.5% of benzoyl peroxide to catalyze the cure. The laminates were made to contain 12 plies of glass fabric; the total thickness of the laminate being about 0.125 inch, and the glass content about 64% by weight. The resin-impregnated glass fabric laminates were cured by placing the uncured laminates in a press adjusted to a temperature of 100° F.; the temperature of the press was then raised to 300° F. over the course of 30 minutes, and held at 300° F. for 15 more minutes.

The flexural strength data obtained on all of the laminates are summarized in the following table.

*Table I*

| Treating Solution Composition | | Flexural Strength (p.s.i.) | |
|---|---|---|---|
| Silane | Catalyst | Initial | After 3 hrs. in Boiling H₂O |
| Vinyltriethoxysilane | None | 53,100 | 27,100 |
| Do | Ammonium hydroxide | 70,200 | 58,800 |
| Vinyltri-n-propoxysilane | None | 63,900 | 44,000 |
| Do | Ammonium hydroxide | 68,800 | 67,400 |
| Vinyltriallyloxysilane | None | 62,000 | 47,200 |
| Do | Ammonium hydroxide | 63,400 | 62,900 |

The flexural strength data in Table I illustrate the importance of the presence of the catalyst in the coating solution. It will be observed that in all cases the flexural strength, particularly the flexural strength after the laminate has been aged in boiling water, is higher for those laminates containing fabric treated with the solution containing ammonium hydroxide than it is for those laminates containing fabric treated with the solution containing no ammonium hydroxide.

EXAMPLE II

This example shows the use of acetic acid (B.P. 118° C., I.C. $1.86 \times 10^{-5}$) in the coating solution to obtain the improved results of my invention. The effect of varying concentrations of acetic acid in the coating solution is also demonstrated.

Laminates were prepared in the same manner as in Example I, except the composition of the priming solution was varied. The solution consisted of a 50:50 mixture of isopropanol and water and 1 part of vinyltriethoxysilane and varying parts of acetic acid per 100 parts of the solvent mixture.

The following table contains a summary of the data obtained on the several laminates. The amount of acetic acid in the coating solution for the fabric in each laminate is also listed.

Table II

| Amount Acetic Acid in Coating Solution | Flexural Strength (p.s.i.) | |
|---|---|---|
| | Initial | After 3 hrs. in Boiling $H_2O$ |
| None | 48,900 | 21,600 |
| 0.05 parts | 58,800 | 42,000 |
| 0.5 | 64,400 | 58,200 |
| 5.0 | 69,200 | 59,900 |

It is evident from the data in Table II that acetic acid is an effective catalyst in the process of this invention.

EXAMPLE III

This example shows the use of chloroacetic acid (B.P. 189.5° C., I.C. $1.55 \times 10^{-3}$) as a catalyst in a coating solution containing vinyltriethoxysilane to obtain the improved results of my invention. The solution was a mixture of equal parts of isopropanol and water, and 1 part of vinyltriethoxysilane and 0.2 part of chloroacetic acid per 100 parts of the solution.

Laminates were prepared in the same manner as in Example I. In the following table are given data obtained on the laminate prepared with the treated fabric and on a laminate similar in all respects except that no catalyst was used in conjunction with the vinyltriethoxysilane treatment of the glass fabric.

Table III

| Catalyst | Flexural Strength (p.s.i.) | |
|---|---|---|
| | Initial | After 3 hrs. in Boiling $H_2O$ |
| None | 53,100 | 27,100 |
| Chloroacetic acid | 58,300 | 51,600 |

The data in Table III make it evident that chloroacetic acid behaves similarly to acetic acid as a catalyst in the process of this invention.

EXAMPLE IV

This example shows the use of monoethanolamine (B.P. 171° C. 757 mm., I.C., $2.5 \times 10^{-5}$) as a base catalyst in a coating solution containing vinyltriethoxysilane to obtain the improved results of my invention. The solution consists of a mixture of equal amounts of isopropanol and water, and 1 part of vinyltriethoxysilane and 1 part of monoethanolamine for each 100 parts of solution.

Laminates were prepared in the same manner as in Example I. In the following table are given data obtained on a laminate prepared with the treated fabric and on a laminate similar in all respects except that no catalyst was used in conjunction with the vinyltriethoxysilane treatment of the glass fabric.

Table IV

| Catalyst | Flexural Strength (p.s.i.) | |
|---|---|---|
| | Initial | After 3 hrs. In Boiling $H_2O$ |
| None | 53,100 | 27,100 |
| Monoethanolamine | 57,400 | 52,300 |

The data in Table IV makes it evident that monoethanolamine functions similarly to ammonia as a catalyst in the process of this invention.

EXAMPLE V

This example shows the effect of variations in composition of solvent used for the silane and catalyst.

Laminates were prepared in the same manner as in Example I, the glass fabric being pre-treated with a solution of 1 part of silane and 1 part of acetic acid (B.P. 118° C.) in 98 parts of solvent. For comparison purposes the catalyst was omitted, in two of these experiments, and 99 parts of solvent were of course used. The same resin as was used in Example I was used in all cases. The data were as follows:

Table V

| Silane | Solvent | Catalyst | Flexural Strength (p.s.i.) | |
|---|---|---|---|---|
| | | | Initial | After 3 hrs. In Boiling Water |
| Allyltriethoxysilane | Petroleum Ether | None | 50,600 | 30,100 |
| Vinyltriethoxysilane | do | do | 55,800 | 36,500 |
| Do | do | 1% Acetic Acid | 58,300 | 37,400 |
| Do | 50% Water and 50% Isopropanol | do | 62,500 | 63,600 |

It will be seen that a hydrocarbon solvent such as petroleum ether is incapable of giving the results given with a solvent composed of water and a water-miscible organic solvent.

In a prior art process (see U.S. Patent 2,611,958— J. O Sommelman et al., to the Dentist's Supply Company) allylethoxysilanes, specifically diallyldiethoxysilane, are used in hydrocarbon solvents to treat glass fibers prior to the incorporation of the glass fibers in a polyester binder. I have found that the treatments with allylethoxysilanes are not as effective as treatments with vinylalkoxysilanes or vinylallyloxysilanes according to the process of this invention irrespective of whether hydrocarbons, or alcohol and water mixtures, or alcohol and water mixtures in conjunction with an acid or base catalyst, are used to prepare coating solutions of allylethoxysilanes.

In the foregoing examples only one polymerizable polyester resin was used. However, the process of the invention works equally well with other polymerizable polyesters. Examples of such other polyesters are as follows:

Resin I—70% of a resin prepared according to the method of U.S. Patent 2,195,362, Example 1, combined with approximately 30% styrene monomer.

Resin II—70% of a resin prepared according to the method of U.S. Patent 2,195,362, Example 1, combined with approximately 30% diallyl phthalate monomer.

Resin III—98 parts of maleic anhydride, 65 parts of ethylene glycol, 40 parts of dicyclopentadiene were heated in a pot for 1 hour at 150° C., followed by 3 hours at 190–200° C. under an atmosphere of carbon dioxide. This alkyd had an acid number of 52. To 65 parts of the alkyd was added 35 parts of styrene.

Resin IV—88 parts of maleic anhydride, 148 parts of phthalic anhydride, 29 parts of tetrachlorophthalic anhydride, and 130 parts of ethylene glycol were heated about 4 hours at 220° C. The alkyd so prepared had an acid number of 40. To 70 parts of the alkyd 30 parts of styrene was added.

In the foregoing examples the glass fabric was dried by placing it on a hot metal plate for a short period. This is a very practical method because only very short drying cycles are required. Alternatively, however, drying can be carried out by oven heating, infrared heating, etc. It is necessary only to have the drying conditions sufficiently reduced to remove the solvent.

It is desirable to have water in admixture with the alcohols or acetone in the solvating medium. Water, however, cannot be used alone because the vinylalkoxysilanes and vinylallyloxysilanes are not completely soluble therein. It is not possible to state a definite limit to the amount of water which can be tolerated in the solvent mixture because the amount varies somewhat with the type of silane treating material used and with the type of organic solvent used. In most instances, however, the preferred amount of water will be in the range 40%–70%. Amounts of water less than 40% and in fact down to about 10% can be used, but no worthwhile advantage is gained over the use of higher amounts of water. When amounts of water in excess of 70% are used in the co-solvent mixture, a true solution is not obtained but rather a colloidal suspension. Such colloidal suspensions are not satisfactory for use in my invention.

My invention is applicable to the preparation of resin bonded, glass fiber structures regardless of the arrangement of the glass fibers in the structures. As has been demonstrated in the preceding examples, glass fabric laminates having improved flexural strength can be made by the process of my invention. My invention may be applied equally well to improve the properties of polyester structures reinforced with randomly oriented, chopped glass fibers. Another type of construction that can be made in accordance with my invention is one in which the glass fibers are oriented in one direction.

From the foregoing it will be seen that my invention provides a simple, economical and commercially feasible method of improving the bonding of polyester resins to glass. The invention enables this improved bonding to be obtained by pre-treating the glass with vinylalkoxysilane or a vinylallyloxysilane. The novelty of my invention is particularly indicated by the fact that although the weak acid or base catalyst is highly effective in the treatment of glass with vinylalkoxysilanes and vinylalloxysilanes, such a catalyst does not enhance the effectiveness of treatment of glass with vinyl-2-chloroalkoxysilanes, vinylacetoxysilanes, or reaction products of vinylhalosilanes and diols.

Having thus described my invention, what I claim and desire to protect by Letters Patent is:

1. The method which comprises coating the surface of clean glass with a solution of a material selected from the group consisting of vinylalkoxysilanes and vinylallyloxysilanes, said silanes having the formula $$(CH_2=CH)_n-Si(OR)_{4-n}$$

wherein $n$ is 1 or 2 and R is selected from the group consisting of alkyl groups having not more than four carbon atoms and the allyl group, and a catalyst selected from the group consisting of organic acids and organic amines having ionization constants at 25° C. between $5\times10^{-3}$ and $5\times10^{-6}$ in a solvent medium composed of water and a water-miscible organic solvent, said catalyst being so volatile that it is removed during the hereinafter-mentioned step of heating to evaporate said solvent, and heating to evaporate said solvent and said catalyst.

2. The method which comprises coating the surface of clean glass with a solution of a material selected from the group consisting of vinylalkoxysilanes and vinylallyloxysilanes, said silanes having the formula $$(CH_2=CH)_n-Si(OR)_{4-n}$$

wherein $n$ is 1 or 2 and R is selected from the group consisting of alkyl groups having not more than four carbon atoms and the allyl group, and a catalyst selected from the group consisting of organic acids and organic amines having ionization constants at 25° C. between $5\times10^{-3}$ and $5\times10^{-6}$ in a solvent medium composed of water and a water-miscible organic solvent, said catalyst being so volatile that it is removed during the hereinafter-mentioned step of heating to evaporate said solvent, heating to evaporate said solvent and said catalyst, associating the thus-treated glass surface with a curable polyester resin composition comprising a polymerization catalyst, an esterification product of an alpha-ethylenic alpha,beta-dicarboxylic acid with a glycol, said product being an advanced linear polyester containing unesterified carboxyl groups and having an acid number of from 5 to 100 and being miscible with and copolymerizable with the liquid monomeric unsaturated polymerizable compound containing an ethylenic linkage hereinafter mentioned to yield a solid resinous material, and a liquid monomeric unsaturated polymerizable compound containing an ethylenic linkage, and curing said polyester resin composition.

3. The method of claim 2 wherein said solvent medium is composed of from 10 to 80% by weight of water and correspondingly from 90 to 20% by weight of a solvent selected from the group consisting of ethanol, isopropanol, n-propanol and acetone.

4. The method of claim 2 wherein said catalyst is acetic acid.

5. The method which comprises coating the surface of clean glass fiber with a solution of a material selected from the group consisting of vinylalkoxysilanes and vinylalloxysilanes, said silanes having the formula $$(CH_2=CH)_n-Si(OR)_{4-n}$$

wherein $n$ is 1 or 2 and R is selected from the group consisting of alkyl groups having not more than four carbon atoms and the allyl group, and a catalyst selected from the group consisting of organic acids and organic amines having ionization constants between $5\times10^{-3}$ and $5\times10^{-6}$ in a solvent medium composed of water and a water-miscible organic solvent, said catalyst being so volatile that it is removed during the hereinafter-mentioned step of heating to evaporate said solvent, heating to evaporate said solvent and said catalyst, associating the thus-treated glass fiber with a curable polyester resin composition comprising a polymerization catalyst, an esterification product of an alpha-ethylenic alpha,beta-dicarboxylic acid with a glycol, said product being an advanced linear polyester containing unesterified carboxyl groups and having an acid number of from 5 to 100 and being miscible with and copolymerizable with the liquid monomeric unsaturated polymerizable compound containing an ethylenic linkage hereinafter mentioned to yield a solid resinous material, and a liquid monomeric unsaturated polymerizable compound containing an ethylenic linkage, and curing said polyester resin composition.

6. The method which comprises coating the surface of clean glass fabric with a solution of a material selected from the group consisting of vinylalkoxysilanes and vinyl-allyloxysilanes, said silanes having the formula $$(CH_2=CH)_n-Si(OR)_{4-n}$$

wherein $n$ is 1 or 2 and R is selected from the group consisting of alkyl groups having not more than four carbon atoms and the allyl group, and a catalyst selected from the group consisting of organic acids and organic amines having ionization constants between $5\times10^{-3}$ and $5\times10^{-6}$ in a solvent medium composed of water and a water-miscible organic solvent, said catalyst being so volatile that it is removed during the hereinafter-mentioned step of heating to evaporate said solvent, heating to evaporate said solvent and said catalyst, assembling a plurality of layers of the thus-treated glass fabric into a laminated structure having interposed between adjacent layers of fabric a curable polyester resin composition comprising a polymerization catalyst, an esterification product of an alpha-ethylenic alpha,beta-dicarboxylic acid with a glycol, said product being an advanced linear polyester containing unesterified carboxyl groups and having an acid number of from 5 to 100 and being miscible with and copolymerizable with the liquid monomeric unsaturated polymerizable compound containing an ethylenic linkage hereinafter mentioned to yield a solid resinous material, and a liquid monomeric unsaturated polymerizable compound containing an ethylenic linkage, and curing said polyester resin composition.

7. The method of claim 2 wherein said material is vinyltriethoxysilane.

8. The method of claim 2 wherein said material is vinyltripropoxysilane.

9. The method of claim 2 wherein said material is vinyltriallyloxysilane.

10. The method which comprises coating the surface of clean glass with a solution of vinyltriethoxysilane and triethanolamine in a solvent composed of water and a water-miscible organic solvent and heating the coated glass to evaporate said solvent and the triethanolamine.

References Cited in the file of this patent

UNITED STATES PATENTS

| | | |
|---|---|---|
| 2,195,362 | Ellis | Mar. 26, 1940 |
| 2,255,313 | Ellis | Sept. 9, 1941 |
| 2,439,689 | Hyde | Apr. 13, 1948 |
| 2,512,390 | Sommer | June 20, 1950 |
| 2,563,288 | Steinman | Aug. 7, 1951 |
| 2,568,384 | Cheronis | Sept. 18, 1951 |
| 2,649,396 | Witt et al. | Aug. 18, 1953 |
| 2,834,693 | Jellinek | May 13, 1958 |